Patented July 9, 1946

2,403,501

UNITED STATES PATENT OFFICE 2,403,501

ALKYLATION PROCESS AND PRODUCTS PRODUCED THEREBY

Louis A. Clarke, Fishkill, N. Y., assignor to The Texas Company, New York, N. Y., a corporation of Delaware No Drawing. Application February 4, 1942, Serial No. 429,471

2 Claims. (Cl. 260—683.4)

My invention relates to an improved process for the alkylation of isobutane and to an improved alkylation product produced thereby.

In the past, isobutane has been alkylated with various olefins, using sulfuric acid as a catalyst for the reaction. Certain other catalysts have been suggested for this purpose, but up to the present time sulfuric acid has proven to be the most advantageous and has been used almost exclusively in commercial operation. When using this catalyst for isobutane alkylation, it has been found that the normal butylenes are more advantageous alklylating agents than isobutylene, with the result that large quantities of isobutylene have been utilized for polymerization, rather than for alkylation. The yields of motor fuel from the former process, however, are very low when compared to alkylation, and there has, therefore, been a demand for a more satisfactory method of utilizing isobutylene as an alkylating agent.

I have now found that if a hydrogen fluoride catalyst is employed, under the conditions described below, isobutane may be alkylated by isobutylene to produce high yields of alkylate of exceptionally high quality. The over-all alkylates which may be produced by my process, when using the preferred operating conditions, are characterized by a total octane content of at least 80 per cent by volume, an iso-octane content of at least 50 per cent by volume, high octane numbers, usually at least 96, and high lead susceptibilites. These alkylates, on addition of tetraethyl lead, are also characterized by low accelerated gum tests and high performance in supercharged engines, especially at lean fuel/air ratios.

For the production of the highest quality alkylates, it is desirable to employ substantially pure isobutylene as the alkylating agent. However, commercially available alkylating agents will usually comprise mixtures of hydrocarbons, and such mixtures may be employed in my process if isobutylene is the predominant olefinic constituent. In the utilization of most available gas mixtures which contain isobutylene, it will usually be desirable to effect a concentration of the isobutylene to produce a suitable alkylating agent for the production of high quality alkylates. The greater the concentration which is effected, the greater advantage is taken of my present process; and the best results are secured if the alkylation is effected by means of isobutylene substantially in the absence of other olefins.

Although it is desirable to use isobutylene as the predominant or sole olefinic alkylating agent in my process, it is not necessary that this compound be used in the form of the monomeric olefin. Isobutylene polymers, such as di-isobutylene and tri-isobutylene, are very satisfactory alkylating agents. Isobutylene addition products, such as tertiary butyl fluoride and tertiary butyl alcohol may also be used as alkylating agents, although the latter compound will form water of reaction, which must be taken into consideration in view of its diluting action on the catalyst. It is to be understood, therefore, that when the term "isobutylene" is used herein, it is to be construed as including isobutylene compounds of the above types, which are equivalent to monomeric isobutylene as alkylating agents.

The catalyst for my process preferably comprises substantially anhydrous hydrogen fluoride. Concentrated aqueous solutions of hydrogen fluoride may be employed, but the presence of water generally tends to decrease catalyst life in the process, and too great a dilution of the hydrofluoric acid may destroy its catalytic activity or cause undue corrosion difficulties. It is therefore desirable to maintain the hydrofluoric acid at at least 95 per cent strength, and as stated before, I prefer to employ substantially anhydrous hydrogen fluoride.

In carrying out the process of the present invention, the isobutane, isobutylene, and catalyst are contacted for a sufficient length of time to effect the reaction, utilizing any suitable batch or continuous method of operation. The reaction mixture is then separated into a hydrocarbon phase and a catalyst phase, and unreacted hydrocarbons are separated from the hydrocarbon phase by distillation, leaving the alkylation product as a distillation residue. The methods for securing intimate contact of the reactants and catalyst, and other mechanical features of the process may follow closely the procedures utilized in sulfuric acid alkylation. The optimum reaction conditions, on the other hand, differ from those of sulfuric acid alkylation, as will be discussed below.

The alkylation reaction in the presence of a hydrogen fluoride catalyst will proceed over a relatively wide temperature range, e. g. from below zero degrees F. to 120° F. or even above. However, for the production of high quality alkylates, a narrower temperature range must be utilized, and I generally prefer to use ordinary room temperatures. I have obtained exceptionally high quality alkylates when effecting the reaction at temperatures of about 70° F., and I have found that the quality of the alkylates decreases slowly, with lowering temperature, and more rapidly as the temperature is increased greatly above 70° F. A temperature range of 60 to 80° F. is generally desirable for the production of high quality alkylates, and this temperature range is also advantageous in requiring no refrigeration other than that provided by readily available cooling water, and in minimizing difficulties due to viscous emulsions, such as are encountered in low temperature sulfuric acid alkylation. From a practical standpoint, it is unnecessary to attempt to operate outside this range. It is to be understood, however, that my process is not to be construed as limited to these particular temperatures, since the reaction will proceed at temperatures considerably above or below these values.

Since the reactants in this process are normally gaseous, and substantially liquid phase conditions are preferred for the alkylation, the reaction mixture should be maintained under sufficient pressure for this purpose. A pressure of 60 pounds per square inch, gauge, will generally be suitable for reaction mixtures substantially free from compounds of lower molecular weight than butylene, although considerably higher pressures may be employed if desired.

The ratio of isobutane to olefin in the reaction mixture is an essential feature of my process, for the production of high quality alkylates. The ratio of isobutane to olefin in the hydrocarbon charge must be maintained at least as high as 4:1, and is preferably maintained at 5:1, or above. Improved results are obtained by greatly exceeding these values, but the improvement in alkylate quality usually does not warrant extremely high ratios in the charge mixture. The upper limit of the ratio in the charge mixture will therefore be determined by economic considerations. In continuous operation of the process, on the other hand, it is possible to increase the effective ratio in the reaction zone very considerably above the ratio in the hydrocarbon charge, by the use of various expedients such as isobutane recycle, emulsion recycle, or the use of split olefin feed when employing a plurality of reactors in series. By using one or more of these operations, it is possible to secure a ratio of isobutane to olefin, at the point of initial contact of the olefin with catalyst, as high as several hundred to one. Generally, however, it is unnecessary to exceed a ratio of 150:1, and ratios of 100:1 to 150:1 represent a desirable operating range for continuous alkylation.

For the production of high quality alkylates it is also preferable to maintain a relatively high concentration of isobutane in the reaction mixture throughout the process, as well as maintaining a high ratio of isobutane to olefin. From this standpoint the presence of diluents such as normal butane in the reaction mixture are undesirable, and the highest quality products are obtainable when employing a reaction mixture consisting of only isobutane and isobutylene. Considerable amounts of diluent, however, do not affect the quality of the alkylate, and it is generally sufficient to maintain the concentration of isobutane in the hydrocarbon phase of the reaction mixture at 50 per cent, by volume, or above. I prefer, however, to maintain a concentration of at least 60 per cent, and as much higher as can be economically effected with the available isobutylene and isobutane supplies.

The amount of catalyst to be employed may vary considerably, depending on the reaction conditions. For batch operation, I prefer to use at least one volume of liquid hydrogen fluoride per five volumes of total liquid hydrocarbons to be added thereto, or at least one volume of hydrogen fluoride per volume of olefin to be employed in the reaction. For continuous operation, I prefer to introduce catalyst and hydrocarbons into the reaction zone in a ratio of at least one volume of catalyst per volume of total hydrocarbons. Amounts of catalyst up to two volumes per volume of total hydrocarbons, or ten volumes per volume of olefin, are very satisfactory and ratios in excess of these may be employed if desired.

The catalyst and hydrocarbons in the reaction zone should be agitated sufficiently to insure intimate contact during the reaction. Any of the mixing or agitating means employed in sulfuric acid alkylation may be employed for this purpose, such as circulating pumps, jet injectors, or internal agitating and circulating devices adapted to circulate the reaction mixture within a single reaction vessel. The agitation should be sufficient to produce a finely divided emulsion which will be stable until it is desired to separate the hydrocarbon and catalyst phases at the conclusion of the reaction. Increased agitation generally improves the results secured, and the ultimate limit in this regard will be determined by economic considerations, in view of the power consumption required to improve agitation sufficiently to effect an improvement in yield or quality of the alkylate, and the difficulties which may be encountered in separating a very finely divided and relatively stable emulsion.

The time required for completion of the alkylation reaction will depend to some extent upon the temperature employed, but will generally be of the order of 30 minutes. A contact time of 30 minutes is very satisfactory for operation at 60 to 80° F., but somewhat improved results may be obtained by the use of longer contact times. "Contact time," in this connection, signifies the time required to displace the hydrocarbon phase in the reaction zone by total hydrocarbon feed, i. e. fresh feed plus any external recycled isobutane. Contact times of less than 30 minutes may be employed without adverse effect on the quality of the alkylate, but too short a contact time will tend to decrease the alkylate yield.

Although contact time may serve as a guide for both batch and continuous methods of operation, space velocity represents a better means of control for continuous operation. For the present process, space velocity is considered to be the volumes of hydrocarbon feed per volume of catalyst per hour. For the production of high quality alkylates, the space velocity is preferably maintained between 0.6 and 6.0, based on total hydrocarbon feed, or between 0.1 and 1.0, based on olefin feed.

With the exception of differences pointed out above, my process may be effected in accordance with any of the known procedures for sulfuric acid alkylation, employing batch, concurrent continuous, counter-current continuous, and other equivalent methods of operation.

My invention may be further illustrated by the following specific examples:

*Example 1.*—A reaction vessel equipped with a rotary agitator was charged with equal volumes of anhydrous hydrogen fluoride and isobutane. The agitator was placed in operation, and a feed mixture of isobutane and isobutylene in a 5:1 mol ratio was continuously introduced at the bottom of the vessel at a rate sufficient to give a contact time of 30 minutes, corresponding to a space velocity of 2.0 based on total hydrocarbon feed, or a space velocity of 0.3 based on olefin feed. Sufficient agitation was maintained to produce a finely divided emulsion, which overflowed from the top of the reaction vessel into a settling vessel. The catalyst phase was continuously withdrawn from the bottom of the settling vessel and returned to the reaction vessel. The hydrocarbon phase, which was removed from the top of the settling vessel, was distilled to remove unreacted hydrocarbons and to obtain alkylate as the distillation residue. The reaction temperature was maintained at 70° F. throughout the reaction, and after equilibrium had been attained, a measured quantity of alkylate was collected for determination of yield and product quality. The yield was found to be 191 per cent of alkylate, based on the weight of the olefin feed. Careful fractionation of the alkylate on a column of 20 plate efficiency established an octane content of approximately 90 per cent by volume, and a content of approximately 63 per cent by volume of isooctane (2,2,4-trimethyl pentane). The debutanized over-all alkylate was found to have a CFRM octane number of 97; and this alkylate plus 3 c. c. of tetraethyl lead per gallon was found to be equivalent to iso-octane plus 1.71 c. c. of tetraethyl lead per gallon in the CFRM test.

*Example 2.*—The procedure of Example 1 was followed, utilizing a 5.1:1 mol ratio of isobutane to isobutylene in the feed, a contact time of 45 minutes, and a space velocity of 1.33, based on total hydrocarbon feed, or 0.22, based on olefin feed. The alkylate yield was 180 per cent based on the isobutylene charge. Careful fractionation of the debutanized alkylate showed an octane content of approximately 85 per cent by volume, and a content of 2,2,4-trimethylpentane of approximately 57 per cent by volume. An aviation type motor fuel was prepared by adding to the overall alkylate 3 c. c. of tetraethyl lead per gallon, and the antiknock properties of this fuel were determined in a supercharged engine, in accordance with test method AFD-3C. It was found that with fuel/air ratios ranging from 0.06 to 0.11, this fuel was equivalent to iso-octane reference fuel $S_1$ plus at least 2.0 c. c. of tetraethyl lead per gallon, with especially outstanding performance at the lean fuel/air ratios.

*Example 3.*—A reaction vessel equipped with a rotary agitator was charged with 220 parts by weight of anhydrous hydrogen fluoride and 560 parts by weight of isobutane. Approximately 108 parts by weight of di-isobutylene was added over a period of 60 minutes, while agitating and maintaining a temperature of 70° F. After all of the di-isobutylene had been added, the agitation was continued for an additional 30 minutes, after which the emulsion was allowed to separate, and the hydrocarbon phase was withdrawn and distilled to separate unreacted isobutane. The alkylate yield was 180 per cent, based on the di-isobutylene charge. Careful fractionation of the debutanized alkylate showed an octane content of approximately 85 per cent by volume and content of 2,2,4-trimethylpentane of approximately 55 per cent by volume.

It is to be understood, of course, that the above examples are merely illustrative, and are not to be construed as limiting the scope of my invention. As has previously been pointed out, other equivalent forms of isobutylene, such as its addition products, may be used in place of the monomeric olefin or its polymers. Similarly, crude sources of isobutylene may be employed instead of the pure materials of the above examples, so long as an isobutylene compound is the predominant alkylating constituent. Similarly, other procedures may be employed for effecting the reaction and for maintaining a high isobutane/isobutylene ratio, as, for example, the use of split olefin feed, emulsion recycle, or isobutane recycle in a continuous process. In general, it may be said that the use of any equivalents or any modifications of procedure which would naturally occur to one skilled in the art is included in the scope of my invention. Only such limitations should be imposed on the scope of my invention as are indicated in the appended claims.

I claim:

1. The method of producing a superior alkylate in continuous isobutane alkylation in the presence of an alkylation catalyst consisting essentially of hydrogen fluoride as its active ingredient, which comprises employing an isobutylene alkylating agent substantially in the absence of other olefin alkylating agents, continuously feeding in liquid phase a premixed hydrocarbon charge consisting essentially of isobutane and the isobutylene alkylating agent substantially free from other olefin alkylating agents in a molar ratio of isobutane to isobutylene of at least 4:1 into an enlarged alkylation reaction zone containing a large agitated body of finely divided emulsion of liquid hydrocarbons and hydrofluoric acid catalyst, maintaining an isobutane concentration in the hydrocarbon phase of the reaction mixture in said zone of at least 50% by volume, maintaining the temperature of the reaction zone within the range of 60-80° F., maintaining a ratio of from one to two volumes of hydrofluoric acid catalyst per volume of total hydrocarbons in the reaction zone, recirculating the emulsion in said reaction zone to provide an isobutane to isobutylene molar ratio at the point of initial contact of the isobutylene alkylating agent with the hydrofluoric acid catalyst substantially in excess of 100:1, controlling the hydrocarbon feed rate to provide a space velocity of 0.6 to 6.0 based on total hydrocarbon feed, continuously removing a small stream of the reaction mixture from the large body in the reaction zone to a settling zone where hydrocarbon phase separates from catalyst phase, continuously removing a stream of the hydrocarbon phase from said settling zone, and debutanizing said stream of hydrocarbon phase to obtain a total debutanized alkylate having an octane content of at least 80% by volume, a 2,2,4-trimethylpentane content of at least 50% by volume, and a C. F. R. M. octane number of at least 96.

2. A debutanized over-all alkylate from hydrogen fluoride catalyzed alkylation of isobutane with an isobutylene alkylating agent substantially free from other olefin alkylating agents, characterized by an octane content of at least 80% by volume, a 2,2,4-trimethylpentane content of at least 50% by volume, a clear C. F. R. M. octane number of at least 96, and an AFD–3C rating with the addition of 3 cc. of tetraethyl lead per gallon of isooctane reference fuel $S_1$ plus at least 2.0 cc. of tetraethyl lead per gallon at fuel/air ratios from 0.06 to 0.11 with especially outstanding performance at the lean fuel/air ratios.

LOUIS A. CLARKE.